Dec. 1, 1953  F. S. ALLINQUANT  2,661,207
RESILIENT SHOCK-ABSORBING SUSPENSION DEVICE
Filed March 1, 1949  7 Sheets-Sheet 1

Fernand Stanislas Allinquant
Inventor
By ⟨signature⟩
Attorney

Dec. 1, 1953    F. S. ALLINQUANT    2,661,207
RESILIENT SHOCK-ABSORBING SUSPENSION DEVICE
Filed March 1, 1949    7 Sheets-Sheet 6
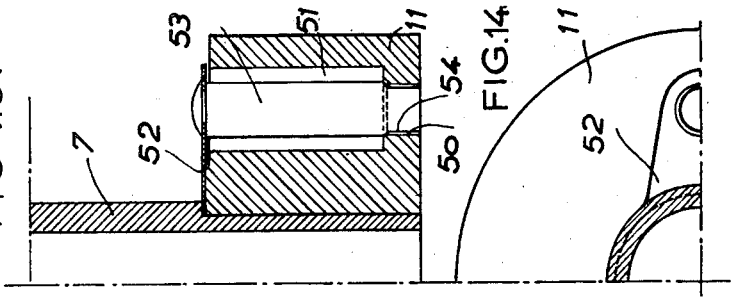
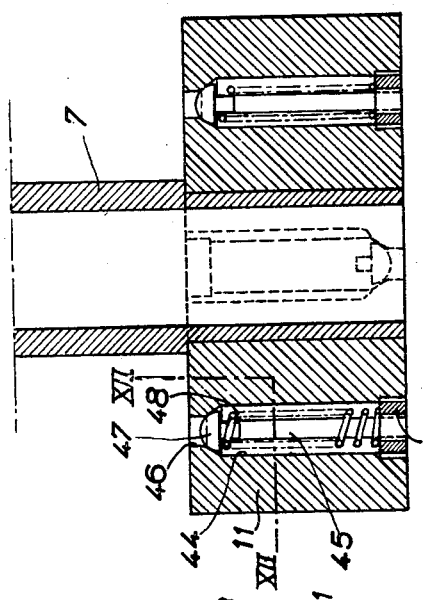
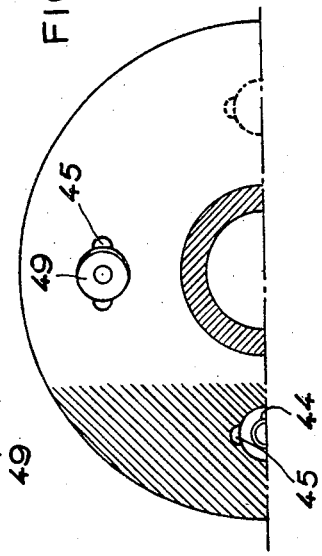
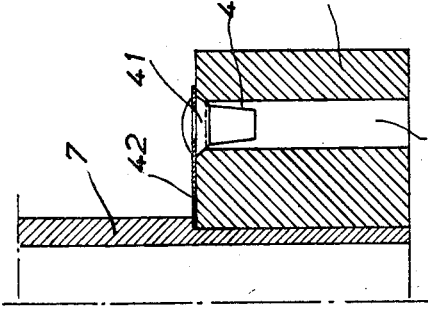
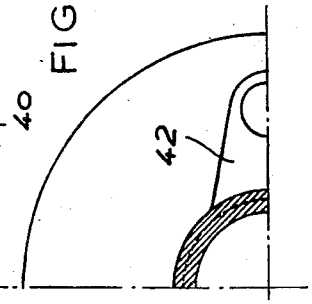
Fernand Stanislas Allinquant
Inventor
By Robert E. Burns
Attorney Dec. 1, 1953    F. S. ALLINQUANT    2,661,207
RESILIENT SHOCK-ABSORBING SUSPENSION DEVICE
Filed March 1, 1949    7 Sheets-Sheet 7

Fernand Stanislas Allinquant
Inventor
By Robert E Burns
Attorney

Patented Dec. 1, 1953

2,661,207

UNITED STATES PATENT OFFICE 2,661,207

RESILIENT SHOCK-ABSORBING SUSPENSION DEVICE

Fernand Stanislas Allinquant, Paris, France

Application March 1, 1949, Serial No. 78,953

Claims priority, application France March 9, 1948

5 Claims. (Cl. 267—64)

My invention relates to a resilient shock-absorbing suspension device primarily designed for use in vehicles.

The resilient feature in a suspension system is generally provided by a spring device interconnecting the body of the vehicle with the chassis or an independent wheel, and the damping of the relative movements between both elements interconnected by the springs is obtained through the use of separate shock-absorbers acting to retard the oscillations either through friction or through the throttled flow of a fluid through restricted passages.

It is an object of my invention to combine within a single unit means providing both resiliency and shock-absorption or damping. For this purpose I have designed an apparatus of the hydraulic damper type, but wherein the operative fluid medium comprises both a gas and a liquid, and means for compressing said gas during the relative movement between the parts, whereby imparting resiliency to said movements, said means being at the same time operative to discharge said liquid through restricted passages to retard said movement.

My device as a whole comprises two hollow members slidable in and opening into one another, so as to define a variable capacity enclosure, an upper one of said members being formed at its base as an annular piston, while the lowermost member forms a cylinder adapted to receive said piston therein, the said enclosure being filled in its upper portion with a compressed gas adapted to impart elasticity to the relative movement between both hollow members, and containing beneath said gas and up to a level somewhat above said cylinder a damping liquid, and the piston being formed with restricted passages for said liquid adapted to retard the flow thereof from one to the other of said cylinder spaces on the respective sides of said piston, to damp said movement.

Another object of my invention is to provide for the flow of damping liquid through the piston in such a manner as to avoid the occurrence of any eddies liable to cause cavitation or vortices within the liquid. For this purpose I provide said passages with cross sections adapted to exert shear on the liquid vein, thereby causing a considerable loss of head therefore through friction at the same time as a uniform and eddy-free flow of liquid is produced.

A further object of the invention is to provide a device of the type described which is of simple construction, highly fluid-tight in operation and efficiently protected against obstruction and clogging liable to impair its proper operation.

Other objects, advantages, and features of the invention will appear from the ensuing description made in reference with the accompanying drawings illustrating some exemplary embodiments thereof and in which.

Figures 9 and 10 respectively illustrate a partial view in axial section of one embodiment of an annular piston showing a retarding valve device, and a corresponding plan view.

Figures 11 and 12 respectively show an axial section and half a plan view partly in section on line XII—XII of Figure 11 of another modification.

Figures 13 and 14 are views similar to Figures 9 and 10 of another embodiment.

Figure 15:
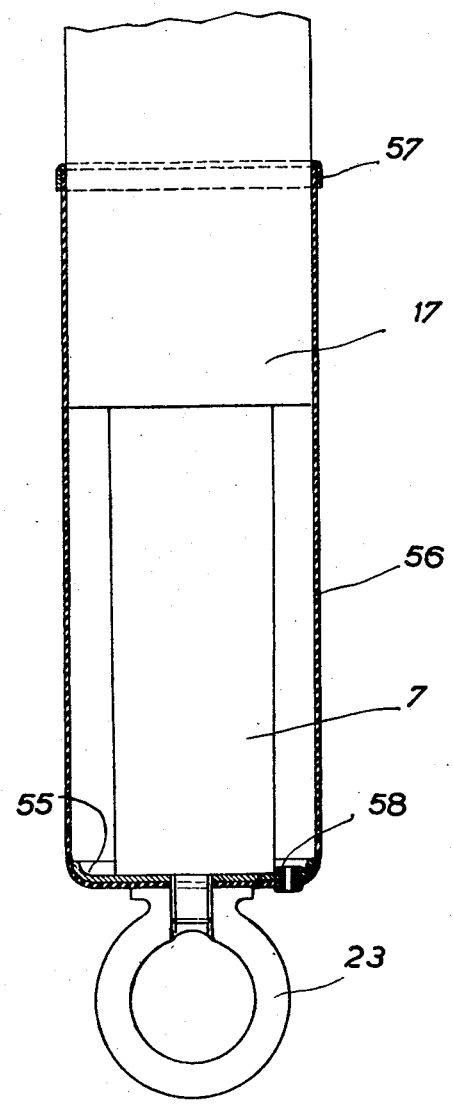

Figure 15 illustrates a protecting means.

Figure 1:
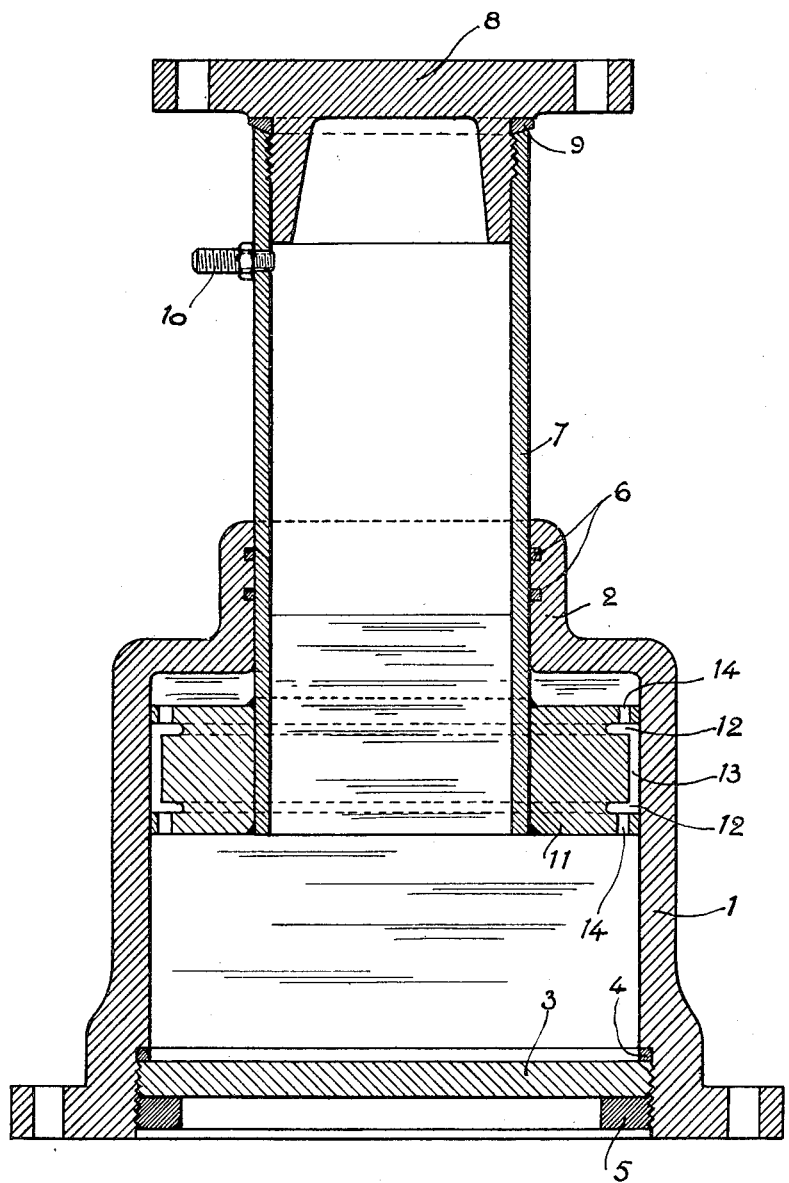
Figure 1 is a general view in axial section of a first embodiment of the invention.

The device as shown in Figure 1 comprises two hollow members telescopable in and opening into each other, each terminating in a flange serving to secure the related member with a respective one of two elements to be interconnected, the lower hollow member being for example secured to a vehicle wheel while the upper member is secured to the body of said vehicle.

In the example shown, the lower hollow member 1 is formed with a cylinder bore therein and is provided at its top with a bored boss 2. The cylinder is sealed at its base with a solid plug 3 cooperating with a sealing gasket 4 and blocked by means of a threaded lock-ring 5. Within the bore of the boss which is provided with seal rings 6 of any suitable type, there is slidably mounted a tube 7 constituting the main portion of the upper hollow member.

Said tube has its end sealed with a plug 8 which carries the above-mentioned flange, centred and threaded into the tube and clampingly engaging a gasket 9. The tube has secured to its side wall towards the top thereof a valve 10 serving to introduce air under pressure into the tube.

The tube has welded to it adjacent its lower end an annular piston 11 formed with calibrated passages interconnecting both sides of said piston. Said piston is adapted to act as a liquid-throttling member. Each of said throttling passages may be formed as follows: spaced from each face of the piston there is an annular groove 12, the section of the piston periphery between said grooves being machined to a somewhat smaller diameter than the diameter of the cylinder bore, thus providing a restricted annular passage 13 of predetermined width adapted to exert the desired shearing or throttling action on the liquid, said annular passage being put in communication with the exterior space beyond each piston face through a number of holes 14 the combined cross-sectional area of which is greater than the area of the annular space 13.

The entire capacity thus defined by the cylinder and the tube is filled with liquid up to a level slightly higher, in idle condition, than the top of the cylinder, so that the liquid, such as oil, flowing through the throttle member completely fills the space both above and beneath the piston. The top of the capacity or enclosure contains compressed air admitted through the valve 10, under a pressure such that the upward thrust exerted against the base of the tube plug will balance the load to be supported by the suspension.

Whenever a relative movement occurs between both interconnecting elements, the tube provided with the throttling piston sinks into the cylinder and reduces the volume of the pressure air, thereby increasing the resistant load. The resiliency of the device is therefore that of the compressed air itself. As the tube and the piston sink a depression tends to be created above the piston; however, the pressure prevailing in the liquid which is at all times equal to the pressure of the compressed air is operative to discharge liquid through the throttling device so that said vacuum is immediately filled. The friction undergone by the liquid through the throttling device is effective to damp the relative motion between both members and thus to damp the movements of the suspension.

When such relative movement is very rapid, for instance as a result of a brutal impact on the wheel under consideration, the downward movement of the piston may be too quick to allow the liquid to compensate immediately for the increase in volume above the piston. However, since said movement is slowed down toward the end of the stroke and the increase in pressure increases the rate of flow of the liquid through the throttle member, the liquid will fill said increased space before the initial relative movement of both members away from each other will have set in. On construction, the annular flow section is so predetermined that the instantaneous pressure will be high enough to insure that the liquid will flow through the throttle member at a rate of flow high enough to prevent any cavitation or vortex effect above the piston upon initiation of the relaxing movement of the suspension subsequent to its depression.

Figure 2:
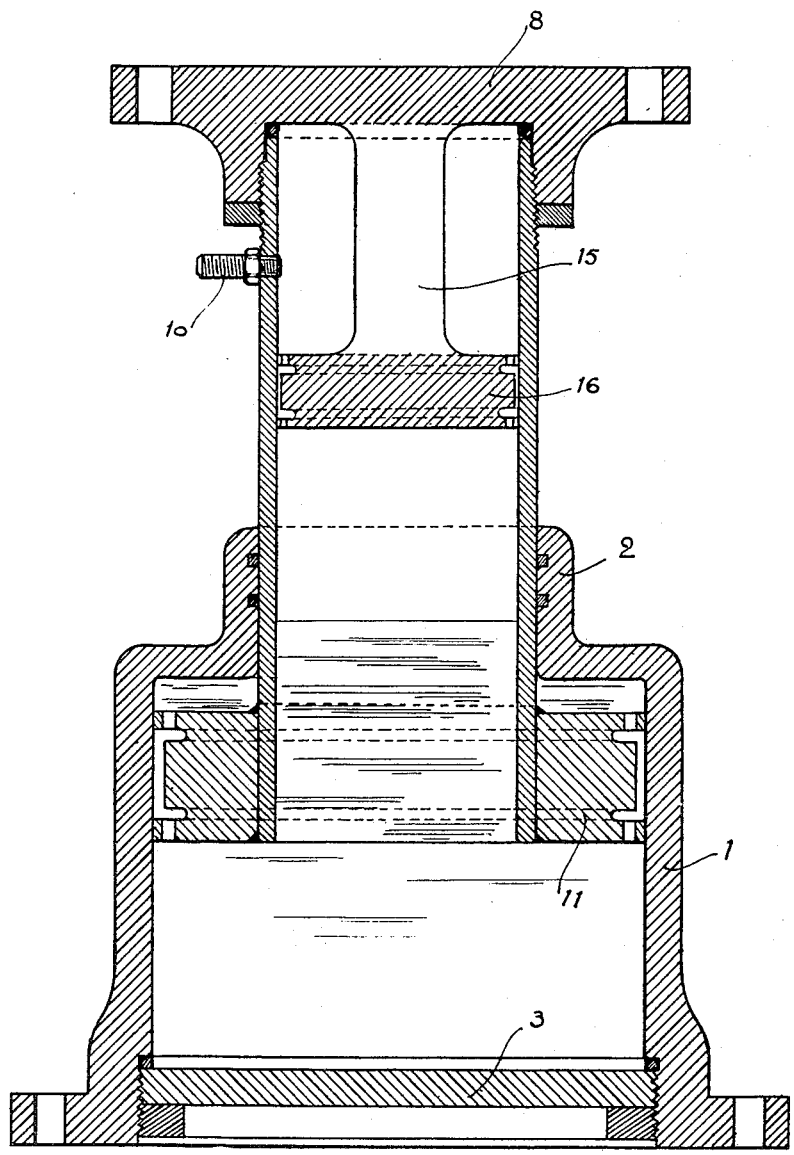
Figure 2 is a similar view of a modification.

As shown in the exemplarly embodiment of Fig. 2, the plug 8 made be made to surround the end of the tube and carry through the medium of a central post 15 thereof an air-throttle member 16 secured to the inside of said tube. Said throttle member may be of similar construction to the liquid throttle member previously described, except for the fact that the calibrated passage therein is of smaller size. This arrangement provides for the separation of the air-space into two intercommunicating volumes.

In the case of comparatively slow relative movement, the air will flow normally through the throttle member 16. If a quick movement occurs on the other hand, the rate of flow of the air through the throttle member is insufficient and will cause a quick build-up of pressure in the restricted volume below it, thereby increasing the rate of flow of liquid through the liquid throttle member 11. This arrangement is effective to avert, in the event of a brutal shock, the occurrence of cavitation effects liable to appear above the liquid throttle member, as the pressures become stabilized towards the end of the stroke on both sides of the throttle member and the liquid fills the capacity above the liquid throttle member before the expansion movement sets in.

Figure 3:
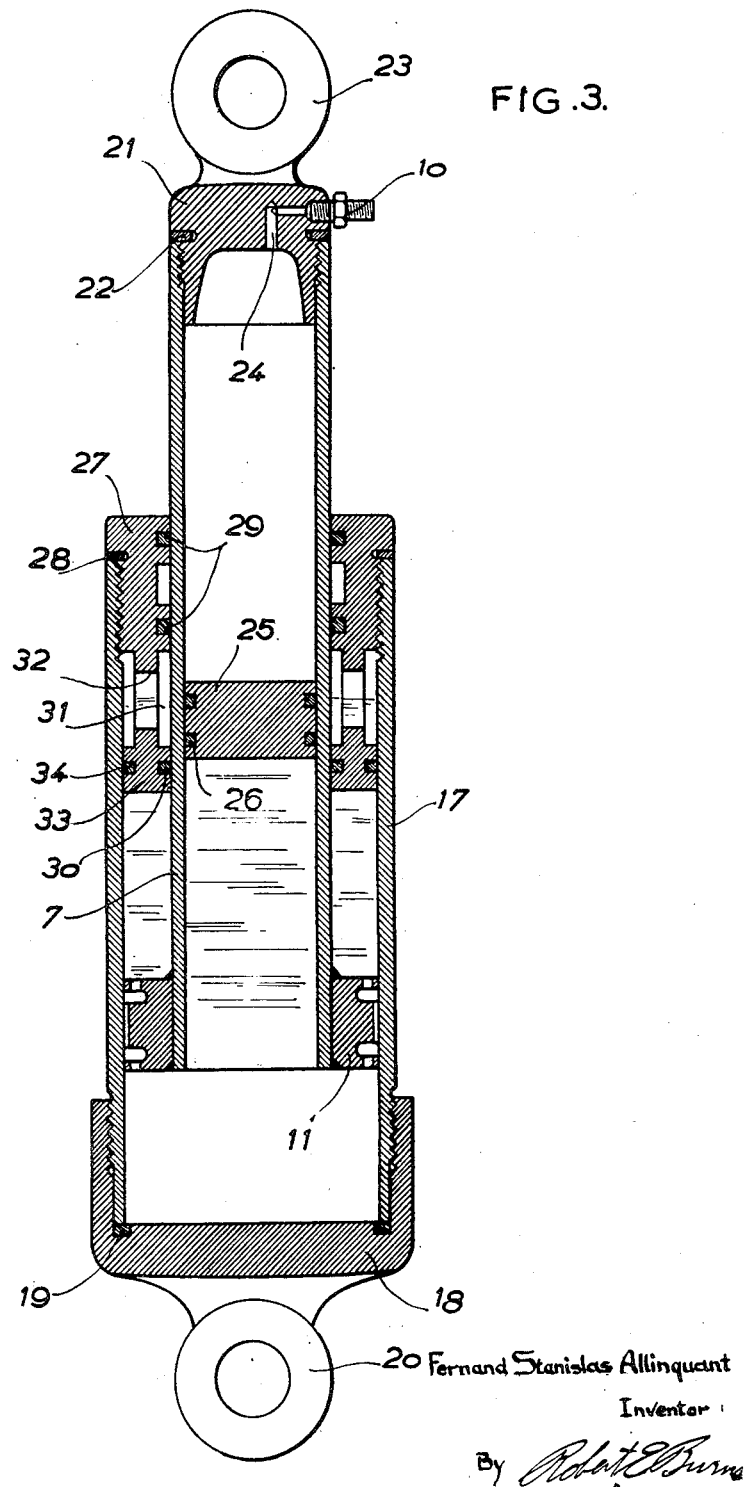
Figure 3 is an axial longitudinal section of another exemplary embodiment of any suspension device.

According to the exemplary embodiment of the suspension device shown in Fig. 3, the lower hollow member is a bored tube 17 sealed at its bottom by a threaded plug 18 centred and clamped over a gasket ring 19 and outwardly provided with a securing eyelet 20. In said cylinder is slidably mounted the oil-throttle piston 11 which is welded to the end of the tube 7 open at its bottom end and sealed at its top end by a screw-plug 21 centred and clamped around a gasket ring 22 and outwardly formed with a securing eyelet 23. Said plug is formed with a duct 24 communicating with the valve 10 through which air under pressure may be admitted into the cylinder.

The cavity thus defined is partly filled with oil up to the level of a free floating piston 25 provided with piston rings 26 and slidable in the hollow piston rod. The top opening of the cylinder is sealed by a threaded bushing 27 clamped over a gasket ring 28. The bushing has slidably mounted therein the hollow rod member 7 engaging gaskets 29 and 30 on both sides of the expansion chamber 31.

Said chamber may be formed by internally and externally machining the bushing in a slicing lathe in the intermediate portion thereof, the remaining portion of the wall being formed with holes 32 placing the machined spaces in communication with each other. The internal end 33 of the bushing is provided with gasket rings 34 in contact with the cylinder. The ring 33 could also be provided as a part separate from the bushing, supported from and alignment with the bushing at a predetermined spacing therefrom through threaded rods respectively secured to said part and said bushing.

The embodiment of Fig. 3 is similar in operation to that described above in reference to Fig. 1, with the exception however that the liquid is herein separated from the gas by the free piston 25 which the gas pressure is operative to maintain applied against the liquid surface. At certain times the oil located in the cylinder space above the annular piston reaches a similar pressure to that of the oil in the cavity, which pressure may be very high in value. It therefore tends to leak past the sealing surfaces of the gasket; on the other hand, the oil above the latter is always at a lower pressure than the oil below, because of the loss of head occurring through said seal surfaces. The gaskets 29 of the bushing are thus effective to provide a perfect seal since they are only subjected to a substantially lower pressure than would be the case if said pressure were that prevailing in the capacity, as in the first-described embodiments.

Figure 4:
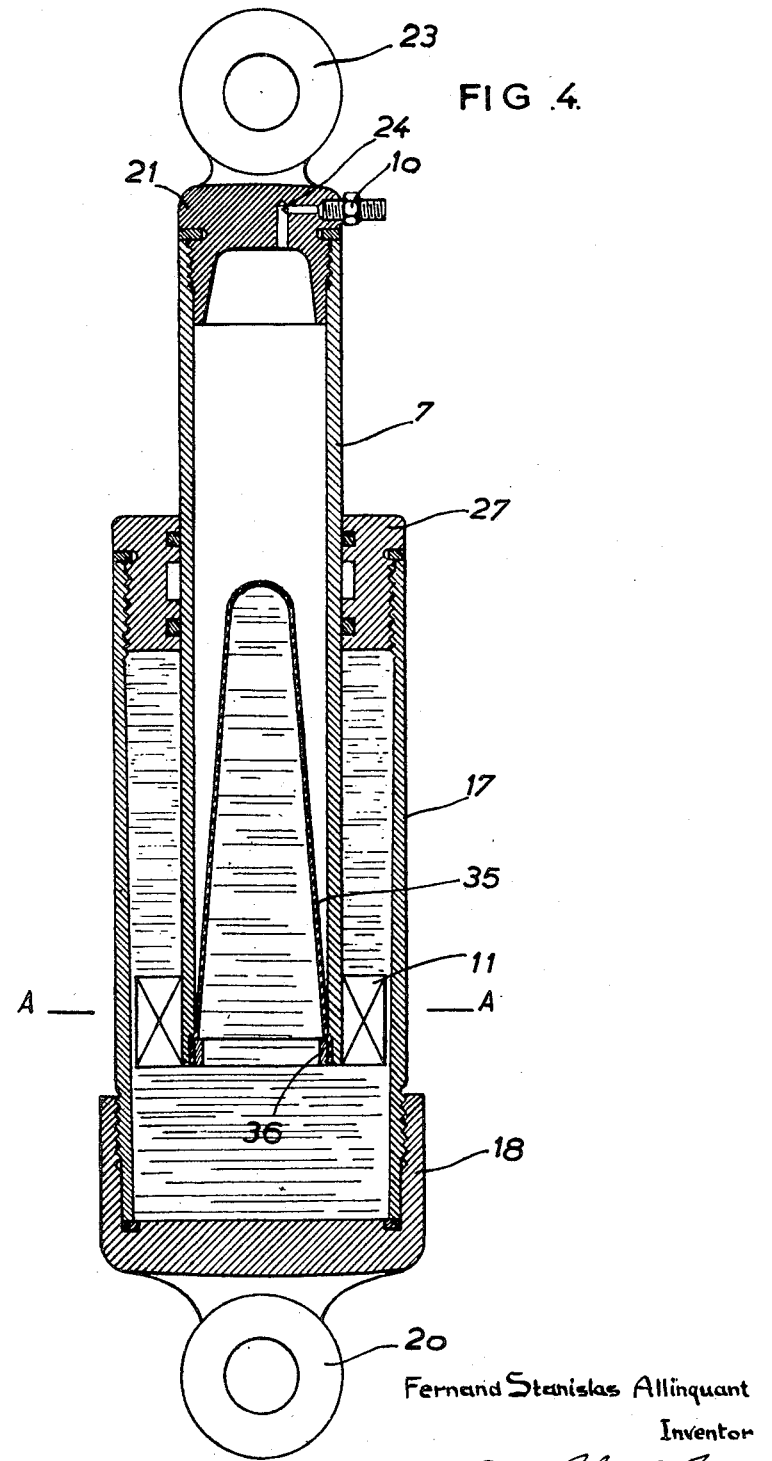
Figure 4 is a similar view of a modification.

In the modification shown in Figure 4, possibility of entrainment of air into the body of liquid during operation of the device is prevented by the fact that a suitable diaphragm 35 is secured at the outlet from the hollow rod member 7 into the cylinder and at the end of the piston 11, said diaphragm serving to separate both fluids from each other. The diaphragm is made of highly resilient material preferably in the form of a sheath the mouth of which is clamped in the outlet of the hollow rod 7 by means of a ring 36 and having its other end sealed and inserted into the rod 7. The diaphragm is subjected to distortion in response to the thrust from the respective fluids. It therefore allows compression of the air volume, by expanding under the thrust of the liquid when the device is compressed. The result of this arrangement is to avoid agitation liable to emulsify the air in the liquid.

According to another feature, to insure that the retarding action occurs gradually during the sinking movement of the piston in the cylinder, the bore of the cylinder 17, as shown in Figure 4 in an exaggerated manner, has imparted to it a slight taper from its outlet towards its end wall, so as to reduce progressively the throttling passages for the liquid through the piston.

The annular piston of the device diagrammatically illustrated in Figure 4 may be constructed, as described in connection with Figs. 1 to 3 for the formation of a fluid-throttling passage. Rather than a narrow unbroken passage extending throughout the periphery of the annular piston, there might be provided a plurality of circumferentially equispaced passages with a restricted cross section, through which the fluid will flow in restricted filaments that are so to speak "pinched" or throttled within said passages.

Figure 5:
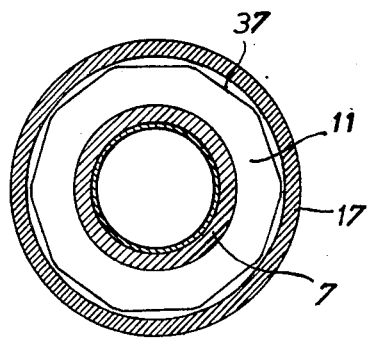
Figures 5 to 8 are views in section on line A—A of Figure 4, showing various alternative forms of construction for the throttled flow passages for the fluid through the piston.

In the example shown in Figure 5, the annular piston is formed on its periphery with facets 37 imparting a regular polygonal configuration to its contour in cross-section and the liquid-throttling passages or ducts are defined between said facets and the inner cylinder wall.

Figure 6:
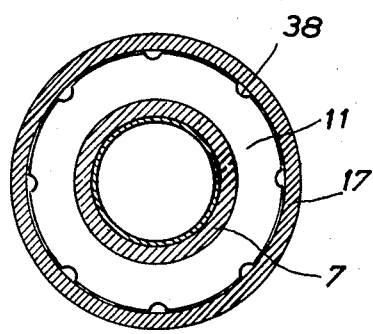

It is also possible as shown in the alternative of Fig. 6, to provide mere groove 38 spaced along the periphery at uniform intervals, said grooves being for instance semicircular in section and presenting cross-sectional areas to the liquid operative to provide the desired throttling action.

Figure 7:
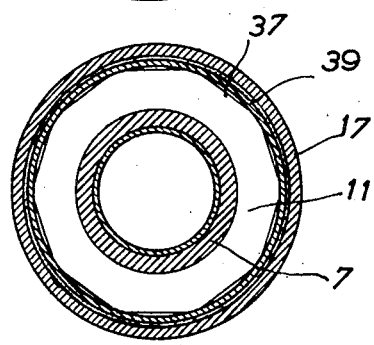
Figure 8:
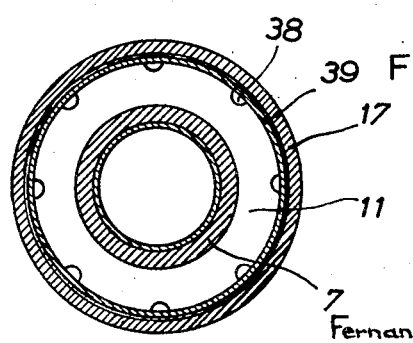

In the modifications of Figs. 7 and 8, ducts of a similar type to those shown in Figs. 5 and 6 may be outwardly limited at the internal surface of a spacer member 39 rather than being outwardly limited at the internal surface of the cylinder, said spacer 39 being press-fitted into the core of the piston-head, the piston being shown as formed with a polygonal contour in Fig. 7 and longitudinally grooved in the alternative of Fig. 8.

In some instances of operation, the sinking and rising movements of the piston may be effected at a very rapid rate, especially in the case of impacts, and the liquid passages through the piston are then liable to be inadequate. A tendency to cavitation may then occur, which is harmful to the proper operation of the device. To overcome this difficulty, pressure-relief valves may be provided in the piston, said relief valves being provided separate from or in combination with the oil-throttling ducts, as desired.

In the example illustrated in Figs. 9 and 10, the annular piston 11 has a number of cylindrical apertures 40 formed therein parallel with the axis of the piston, two such apertures being shown, and sealed with check-valves 41 held in application against their seating at the outlet of the apertures by a spring-plate 42. The seating is frusto-conical and the check-valve is extended by a frusto-conical section 43 defining an annular passage the cross-section of which tapers down from the end of the section 43 to the head of the valve member 41. This passage serves to provide the throttling or pinching action for the liquid as the check-valve is raised during the movements of the piston. This throttling effect is normally applied by the larger-diameter end of the valve-shank 43, but is reduced as the upward travel of the valve increases, especially in the event of a rapid displacement as a result of a violent shock applied to the suspension.

According to the modification shown in Figs. 11 and 12, ducts or passages parallel with the axis of the piston are again provided, four in the example shown, spaced around the circumference of the piston, said ducts being however in this alternative sealed by check-valves that are oppositely-directed in each respective pair of said ducts, as shown. Each duct comprises a cylindrical section 44 with diametrically opposed side enlargements 45 (see Fig. 12) open at the discharge ends thereof, and a restricted diameter section 46 at the opposite end of the cylindrical section 44 sealed by a check-valve 47 held in place by a coil spring 48 seated against a bushing 49 threaded into the discharge end in such a way as to provide clearance for the outlet of the side ducts or passages 45.

As the check-valve 47 is raised, the liquid is throttled at the valve-seat and this throttling action is proportionate in value to the travel of the valve, since the side passages allow free passage for the liquid around the spring above the check-valve.

In the modification shown in Figs. 13 and 14, the ducts are formed as in the previous modification by two holes of different diameters 50 and 51, the larger diameter hole 51 being at the discharge end. On the corresponding face of the annular piston a spring-plate 52 is retained, said spring-plate having secured thereto the head of the cylindrical check-valves 53 which are substantially smaller in diameter than the larger-diameter hole 51, thus defining therewith an annular duct through which liquid can freely flow, while at the same time said check-valves are sufficiently large in diameter to seal effectively the outlet from the smaller-diameter hole 50 to said passage. The cylindrical shank 53 extends into said hole 50 with a section thereof of a somewhat smaller diameter 54 defining a liquid-throttling passage whenever the check-valve is unseated. The degree of damping produced depends on the amount of upward travel of the check-valve and, in the case of a sudden and violent shock or jolt, this upward travel is sufficiently large to provide a high rate of flow for the liquid.

Fig. 15 illustrates a means of protecting the sliding surfaces of the rod member of the device at its penetration into the cylinder. Such surfaces are generally subject to the ingress of dirt and therefore liable to deterioration.

This device is applicable to a shock-absorber of any type. In Fig. 15 the piston rod 7 is shown as terminating in a securing ring 23 adapted thereto and as projecting at its top into the cylinder 17. The securing ring is arranged to block a seating flange 55 against the piston rod, said seating flange being applied against the bottom wall of a sheath of resilient material 56 the margin of which is held clamped around the cylinder with retaining collar 57. A tubular rivet 58 is used to secure the bottom of the sheath to the seating flange and defines an aperture allowing escape of the damping liquid, which will always leak out in some small amount along the piston rod whenever the device may be mounted cylinder-side up, as in the case of Fig. 4 in which the liquid is separated off from the air.

It will be seen that in the movements of the shock-absorber or suspension the piston rod together with its sliding surface at its entry into the cylinder are completely isolated from the exterior, while the sheath made of elastic material such as a highly flexible synthetic rubber for instance, undergoes deformation to conform to the movements of the rod relatively to the cylinder.

It will of course be understood that, while a number of different embodiments of the invention have been illustrated and described, by way of example, these are by no means exhaustive and many further modifications may be resorted to without exceeding the scope of the invention as defined in the ensuing claims.

What I claim is:

1. In a resilient shock-absorbing suspension device, a lower member forming a cylinder having a top part of restricted diameter, an upper tubular member having a sealed top and a fully open bottom tightly slidable in said top part of restricted diameter of the cylinder, and an annular piston fitted on the bottom part of said tubular member and slidable in said cylinder, said upper member defining in said cylinder two separate spaces, liquid filling said members to a level above said cylinder, gas under pressure being confined in the remaining upper portion of said tubular member, said piston comprising spaced peripheral flanges engaging said cylinder and a portion of reduced cross section between said flanges providing an annular passageway between the piston and cylinder, spaced narrow passages being provided through said flanges and communicating with said annular passageway, said passageway being clear and unobstructed and providing the same resistance to fluid flow at all times and in both directions, said passageway being adapted to retard the flow of liquid from one to another of said spaces by a shearing action, and thus to cause a damping of the resilient movement of said upper member with respect to said lower member.

2. A resilient shock-absorbing suspension device according to claim 1, comprising further an unbroken diaphragm of an elastic material in the form of a sheath secured to said tubular member around the open bottom thereof, extending into said tube and separating the liquid from the gas.

3. A resilient shock-absorbing suspension device according to claim 1 in which the cylinder bore is of slightly increasing diameter from its top part towards its bottom part.

4. In a resilient shock-absorbing suspension device, a lower member forming a cylinder having a top part of restricted diameter, an upper tubular member having a sealed top and a fully open bottom tightly slidable in said top part of restricter diameter of the cylinder, and an annular piston fitted on the bottom part of said tubular member and slidable in said cylinder, said upper member defining in said cylinder two separate spaces, liquid filling said members to a level above said cylinder, gas under pressure being confined in the remaining upper portion of said tubular member, said piston comprising spaced peripheral flanges disposed at opposite ends of the piston and engaging said cylinder and a portion of reduced cross section between said flanges providing an annular passageway between the piston and cylinder, peripheral grooves being provided at opposite ends of said reduced portion, said grooves being disposed between said reduced portion and said flanges and being deeper than said reduced portion, spaced narrow passages being provided through said flanges between said grooves and the ends of the piston, said grooves and annular passageway being clear and unobstructed to provide the same resistance to fluid flow at all times and in both directions, said passageway being adapted to retard the flow of liquid from one to another of said spaces by a shearing action, and thus to cause a damping of the resilient movement of said upper member with respect to said lower member.

5. In a resilient shock-absorbing suspension device, a lower member forming a cylinder having a top part of restricted diameter, an upper tubular member having a sealed top and a fully open bottom tightly slidable in said top part of restricted diameter of the cylinder, and an annular piston fitted on the bottom part of said tubular member and slidable in said cylinder, said upper member defining in said cylinder two separate spaces, liquid filling said members to a level above said cylinder, gas under pressure being confined in the remaining upper portion of said tubular member, said piston comprising peripheral flanges disposed at opposite ends of the piston and engaging said cylinder, and a portion of reduced cross section between said flanges providing an annular passageway between the reduced portion of the piston and the cylinder, the axial length of said passageway being greater than the combined axial length of said flanges, circumferentially spaced narrow holes being provided through said flanges between the ends of said passageway and the ends of the piston, said annular passageway being clear and unobstructed to provide the same resistance to fluid flow in both directions, said passageway being adapted to retard the flow of liquid from one to another of said spaces by a shearing action, and thus to cause a damping of the resilient movement of said upper member with respect to said lower member.

FERNAND STANISLAS ALLINQUANT.

References Cited in the file of this patent

UNITED STATES PATENTS

| Number | Name | Date |
| --- | --- | --- |
| 880,257 | Welch | Feb. 25, 1908 |
| 1,055,164 | Green | Mar. 4, 1913 |
| 1,967,640 | Wallace | July 24, 1934 |
| 2,039,135 | Waugh et al. | Apr. 28, 1936 |
| 2,206,110 | Myers et al. | July 2, 1940 |
| 2,224,306 | Krueger | Dec. 10, 1940 |
| 2,379,388 | Thornhill | June 26, 1945 |

FOREIGN PATENTS

| Number | Country | Date |
| --- | --- | --- |
| 513,389 | Great Britain | Oct. 11, 1939 |